United States Patent [19]

Oswald et al.

[11] Patent Number: 4,860,828

[45] Date of Patent: Aug. 29, 1989

[54] GAS FLOODING PROCESSING FOR THE RECOVERY OF OIL FROM SUBTERRANEAN FORMATIONS

[75] Inventors: Thomas Oswald, Fort Saskatchewan; Ian A. Robson, Edmonton, both of Canada

[73] Assignee: The Dow Chemical Company, Midland, Mich.

[21] Appl. No.: 200,824

[22] Filed: Jun. 1, 1988

[51] Int. Cl.$^4$ .............................................. E21B 43/22
[52] U.S. Cl. ..................... 166/274; 166/268; 166/273; 166/275; 252/8.554
[58] Field of Search ................................. 166/272–275, 166/309, 268; 252/8.554

[56] References Cited

U.S. PATENT DOCUMENTS

| | | | |
|---|---|---|---|
| 3,264,242 | 8/1966 | Teot | 260/29.6 |
| 3,634,272 | 1/1972 | Valenta et al. | 252/153 |
| 3,945,437 | 3/1976 | Chiu et al. | 166/305.1 |
| 3,990,515 | 11/1976 | Wilchester et al. | 166/273 |
| 4,113,011 | 9/1978 | Bernard et al. | 166/273 |
| 4,380,266 | 4/1983 | Wellington | 166/252 |
| 4,393,937 | 7/1983 | Dilgren et al. | 166/272 |
| 4,493,370 | 1/1985 | Stapp et al. | 166/273 |
| 4,493,371 | 1/1985 | Reisberg et al. | 166/274 |
| 4,502,538 | 3/1985 | Wellington et al. | 166/252 |
| 4,532,992 | 8/1985 | Coenen et al. | 166/272 X |
| 4,540,049 | 9/1985 | Hawkins et al. | 166/272 |
| 4,556,107 | 12/1985 | Duerksen et al. | 166/272 |
| 4,572,294 | 2/1986 | Duerksen et al. | 166/273 |
| 4,576,232 | 3/1986 | Duerksen et al. | 166/274 |
| 4,601,336 | 7/1986 | Dilgren et al. | 166/252 |
| 4,609,044 | 9/1986 | Lau | 166/270 |
| 4,643,256 | 2/1987 | Dilgren et al. | 166/303 |
| 4,693,311 | 9/1987 | Muijs et al. | 166/272 |
| 4,699,214 | 10/1987 | Angstadt | 166/303 |
| 4,703,797 | 11/1987 | Djabbarah | 166/252 |
| 4,739,831 | 4/1988 | Settlemeyer et al. | 166/273 |

FOREIGN PATENT DOCUMENTS

| | | |
|---|---|---|
| 59-084971A | 5/1984 | Japan . |
| 2184763A | 7/1987 | United Kingdom . |
| WO8505146 | 11/1985 | World Int. Prop. O. . |

Primary Examiner—George A. Suchfield
Attorney, Agent, or Firm—Paula S. Ruhr

[57] ABSTRACT

In a gas flooding or miscible gas flooding operation, the sweep efficiency of the gas is improved using a mixture of an alkylated diphenyl sulfonate and an alpha-olefin sulfonate as the surfactants in a mobility control fluid or diverter.

19 Claims, No Drawings

GAS FLOODING PROCESSING FOR THE RECOVERY OF OIL FROM SUBTERRANEAN FORMATIONS

BACKGROUND OF THE INVENTION

This invention relates generally to a process for the recovery of oil from subterranean formations, and more particularly to a gas flooding or a miscible gas flooding process.

Petroleum or oil is generally recovered from subterranean formations by penetrating the formation with one or more wells and pumping or permitting the petroleum to flow to the surface through the well. In various recovery operations, an external driving force is not required to drive the petroleum to the producing well and/or the surface. For example, some natural driving energy such as an underlying active water drive or a gas under some minimum pressure may possess sufficient pressure to drive the petroleum or hydrocarbon to the well and then to the surface. Recovery of petroleum using natural energy is referred to as primary recovery.

In many instances, the natural driving energy is insufficient or becomes insufficient to cause the petroleum to flow to the well. For example, a substantial portion of the petroleum to be recovered may remain in the formation after depletion of the natural driving energy. In other cases, the subterranean formation, while containing substantial amounts of petroleum, may not possess the necessary driving force to recover any of the petroleum. In such cases, various techniques have been applied heretofore to recover the petroleum. Although such techniques are commonly referred to as secondary recovery, in fact, they may be primary, secondary or tertiary in sequence of employment.

One example of a conventional method for the secondary recovery of petroleum from a subterranean formation involves injecting water or non-miscible gas through one or more injection wells to drive the residual petroleum or oil towards a producing well. A non-miscible gas is one which is not miscible with the hydrocarbons present in the subterranean formation. However, water or non-miscible gas alone do not efficiently displace petroleum. In various operations, the water or non-miscible gas mixture channel through the formation such that a disproportionately high amount of the water or non-miscible gas passes through zones of high permeability into the producing wellbore without contacting appreciable amounts of oil in the reservoir, particularly that oil contained in zones of low permeability. Further, water or non-miscible gas fails to displace even all of the oil in the swept zones because capillary pressure holds residual oil or hydrocarbons in the smaller reservoir capillaries allowing the water or the non-miscible gas to channel around them. This greatly reduces the efficiency of the operation.

One common method of recovering the residual oil trapped in the capillaries of the reservoir after water or non-miscible gas flooding is to contact the residual hydrocarbon with a miscible supercritical fluid. This supercritical fluid is frequently the same as the gas which, under ordinary temperature and pressure is non-miscible, but when subjected to high pressure under the conditions of the subterranean formation becomes a supercritical fluid with which the residual oil is miscible. Thus, under conditions of use, the non-miscible gas used may exist both as a non-miscible gas and as a miscible supercritical fluid. Examples of gases which can exist as supercritical fluids under conditions of use and which are useful in this process include carbon dioxide and mixtures of aliphatic hydrocarbons such as methane, ethane, propane and butane, and may even include nitrogen in very deep wells which can operate under high pressure.

In both the case of gas flood recovery and miscible fluid recovery, the gas or miscible fluid can be injected continuously and simultaneously with water in the same injection well or alternating with slugs of water. Alternatively, the gas or miscible fluid can be injected without water and, in such cases, will frequently form a dispersion with water which naturally exists in the formation or has been injected either previously or subsequently to the gas injection. Although miscible fluid or a simultaneous miscible fluid/water mixture can be employed, miscible fluid or gas flooding generally comprises alternating the injection of miscible gas or fluid and water. In theory, the miscible gas thins or solubilizes the oil from the small capillaries in the formation thus allowing it to flow to the producing well. The water is added to provide some mobility control to the miscible fluid, restricting its advancement to the producing well, thereby causing it to make contact with a larger fraction of the reservoir.

Unfortunately, even in the presence of significant values of water, the gas or miscible fluid is prone to channel through the formation such that a disproportionately high amount of the gas or miscible fluid passes through the swept zones of the reservoir into the producing wellbore without contacting appreciable amounts of oil in the reservoir. Further, in miscible flooding operations, this high rate of flow prevents the pressure in at least parts of the reservoir from reaching the minimum pressure necessary to convert the non-miscible gas to a miscible supercritical fluid. This problem is further exacerbated in reservoirs containing zones of high permeability because both the gas or the miscible fluid and the water preferentially proceed to the producing wells by way of these zones. To prevent channeling of the gas or the miscible fluid and the water and to otherwise control the mobility of the drive fluid or the miscible fluid, thereby increasing oil production, it has been suggested to employ a foam prepared from a mixture of water and a surfactant during the gas flooding and/or miscible fluid flooding operations. Such mixtures have been found to prevent channeling and to force the miscible fluids or the gas drive fluids into the unswept and/or less permeable zones of the reservoir, thereby increasing oil production.

Surfactants which have been found to be useful as a means of modifying the profile in gas flooding or miscible fluid flooding operations are surfactants capable of forming a foam with an aqueous liquid and include alkyl polyethylene oxide sulfates (see, for example U.S. Pat. No. 4,113,011); polyalkoxy sulfonates (see, for example U.S. Pat. No. 4,502,538); polyalkoxylated alcoholic or phenolic surfactants (see, for example U.S. Pat. No. 4,380,266) and the like. Mixtures of surfactants, such as a mixture of an alkylated diphenyl sulfonate and an anionic polyoxyalkylated surfactant, are also known to be useful. (See, for example, U.S. Pat. No. 4,739,831). The surfactant employed in a gas flooding operation is exposed to relatively low temperatures (e.g., less than 120° C.) and water of relatively low purity (i.e., water having a relatively high dissolved solids content). Therefore, surfactants which may be useful in water and/or steam flooding may not necessarily be useful, and are often not useful, in the secondary and/or tertiary oil recovery methods using gas flooding or miscible gas flooding techniques.

Further, the surfactants heretofore taught to be effective in modifying the mobility of the drive fluids in gas flooding or miscible fluid operations have not proved to be particularly effective in every such operation. Specifically, in certain instances, greater foam stabilities are desired to achieve the desired increase in oil production. In other instances, the surfactants have not been found to be particularly effective regardless of their foaming ability as measured in the laboratory.

In view of the deficiencies of the prior art methods for improving the mobility of the drive fluids in gas flooding or miscible fluid operations, it remains highly desirable to provide an improved method for controlling the mobility of the drive fluids in gas flooding operations and of miscible fluids in miscible fluid flooding operations.

SUMMARY OF THE INVENTION

Accordingly, the present invention is a method for recovering hydrocarbons from a subterranean formation. The recovery method comprises injecting, under non-steam flood conditions, sequentially or simultaneously, through an injection well, a drive fluid of a gas or a gas/aqueous fluid mixture to drive the hydrocarbons, or a miscible fluid to thin or solubilize and carry the hydrocarbons, from the formation to a producing well and a mobility control fluid of a surfactant/water mixture, wherein the surfactant component of the mobility control fluid is a mixture of one or more alkylated diphenyl sulfonates and one or more alpha-olefin sulfonates, into the subterranean formation.

As used herein, the term "mobility control" is employed in its broadest sense and is meant to include the term "profile modification". The term "mobility control" is meant to include any process whereby the sweep efficiency of a reservoir is improved or whereby the injection profile of an injection well is altered. The term "sequentially injecting" is meant to include those operations in which the drive fluid or the miscible fluid and the mobility control fluid are injected as separate sequential "slugs" as well as operations in which the drive fluid or miscible fluid is injected continuously and the mobility control fluid is injected either simultaneously with the drive fluid, but on a periodic basis or alone as part or all of the water cycle in a water-alternating-gas process, followed by the injection of the gas drive fluid or the miscible gas.

The mixture of the alkylated diphenyl sulfonate, preferably alkylated diphenyl oxide disulfonate, surfactants has been found to be useful in combination with alpha-olefin sulfonate surfactants, as a mobility control agent in a gas flood operation or a miscible fluid flood operation for the recovery of hydrocarbons from subterranean formations. The mobility control agent is particularly useful in the recovery of hydrocarbons from reservoirs of variable permeability and/or those environments of high temperature, e.g., above about 60° C., or having high concentration of divalent metal anions, e.g., calcium ions. The alkylated diphenyl sulfonate and alpha-olefin sulfonate surfactants act as an excellent mobility control agent, thereby improving the sweep efficiency of the gas drive or miscible fluid and the overall hydrocarbon production, without the need for supplemental surfactants.

Using one or more alkylated diphenyl sulfonates in combination with one or more alpha-olefin sulfonates unexpectedly improves the solubility of the alpha-olefin sulfonates which are insoluble in very concentrated brines and very hard water commonly found in oil reservoirs. The surfactant mixture of the alkylated diphenyl sulfonate and alpha-olefin sulfonate is also stable at high reservoir temperatures ranging to about 120° C. The combination of alkyl diphenyl sulfonates with alpha-olefin sulfonates also surprisingly results in the reduction of the tendency of alpha-olefin sulfonates to adsorb to rocks and clays present within the subterranean formations.

DETAILED DESCRIPTION OF THE INVENTION

The mobility control fluid employed in the practice of the present invention comprises a mixture of one or more alkylated diphenyl sulfonates and one or more alpha-olefin sulfonates. As the term is used herein, alkylated diphenyl sulfonates are preferably represented by the general structural formula:

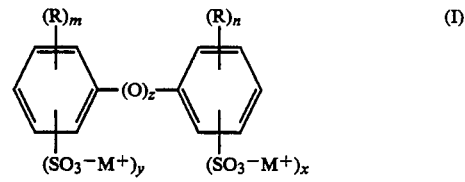

wherein z is 0 or 1, preferably 1; each R is independently an alkyl or substituted alkyl radical; each m and n is independently 0, 1 or 2, provided that at least one of m or n is 1; each M is independently hydrogen, an alkali metal, alkaline earth metal, or ammonium or substituted ammonium and each x and y are individually 0 or 1 with the proviso that at least one of x or y is 1 and preferably each of x and y are 1. Preferably, the R group(s) are independently an alkyl group having from 4 to 14, more preferably from 6 to 10 carbon atoms, most preferably about 10 carbon atoms. The alkyl groups can be linear, branched or cyclic but linear or branched radicals are preferred and linear radicals are most preferred. The $M^+$ ammonium ion radicals are of the formula $(R')_3HN^+$ wherein each $R'$ is independently hydrogen, a $C_1$–$C_4$ alkyl or a $C_1$–$C_4$ hydroxyalkyl radical. Illustrative $C_1$–$C_4$ alkyl and hydroxyalkyl radicals include methyl, ethyl, propyl, isopropyl, butyl, hydroxmethyl and hydroxyethyl. Typical ammonium ion radicals include ammonium $(N^+H_4)$, methylammonium $(CH_3N^+H_3)$, ethylammonium $(C_2H_5N^+H_3)$, dimethylammonium $((CH_3)_2N^+H_2)$, methylethylammonium $(CH_3N^+H_2C_2H_5)$, trimethylammonium $((CH_3)_3N^+H)$, dimethylbutylammonium $((CH_3)_2N^+HC_4H_9)$, hydroxyethylammonium $(HOCH_2CH_2N^+H_3)$ and methylhydroxyethylammonium $(CH_3N^+H_2CH_2CH_2OH)$. Preferably, each M is independently ammonium or substituted ammonium or alkali metal.

The alkylated diphenyl sulfonates and their methods of preparation are well-known and reference is made thereto for the purposes of this invention. Representative surfactants and their methods of preparation are disclosed in U.S. Pat. Nos. 3,264,242; 3,634,272; and 3,945,437 (all of which are hereby incorporated by reference).

In the practice of the present invention, the alkylated diphenyl sulfonate is typically a mixture of compounds having the formula (I) wherein sufficient x and y are 1 such that the sum of x plus y for the alkylated diphenyl sulfonate is at least about 1.5, more preferably at least about 1.75 and most preferably about 2. That is, it is preferred that a mixture of alkylated diphenyl sulfonates are used in the practice of this invention and that at least about 50 percent, more preferably at least about 75 percent and most preferably at least about 90 percent of the alkylated diphenyl sulfonates are disulfonates. In addition, mixtures of a mono- or dialkylated diphenyl sulfonate or a mixture of mono- and dialkylated diphenyl sulfonates can be employed.

Most preferably, an alkylated diphenyl oxide disulfonate or mixture of two or more alkylated diphenyl oxide sulfonates are employed in the practice of the present invention. Non-limiting examples of preferred alkylated diphenyl oxide disulfonates include sodium disulfonated hexyldiphenyl oxide, sodium disulfonated decyldiphenyl oxide and sodium disulfonated dodecyldiphenyl oxide.

The second part of the surfactant mixture useful in the mobility control fluid is an alpha-olefin sulfonate. Alpha-olefin sulfonates useful in the practice of this invention are those which are derived from alpha-olefins having from about 10 to about 18 carbon atoms, preferably about 14 to about 16 carbon atoms. The olefins may be linear, branched or alicyclic with linear olefins being preferred. The alpha-olefin sulfonates may be synthesized by the reaction of the alpha-olefins with sulfur trioxide. This reaction may be conducted according to methods well-known in the chemical arts typically by contact of a flow of dilute sulfur trioxide vapor with a thin film of liquid olefin at a temperature in the range of from about 5° C. to about 50° C. The reaction between the $SO_3$ and the olefin yields an intermediate, believed to be in the nature of a sultone which is subsequently hydrolyzed by reaction with water and neutralized by reaction with a base. Mixtures of alpha-olefin sulfonates are useful in the practice of this invention. It is most preferred to use a mixture of alpha-olefin sulfonates wherein the mixture contains equal numbers of molecules having about 14 and about 16 carbon atoms, respectively.

In preparing the surfactant component of the mobility control fluid, the alkylated diphenyl sulfonate and alpha-olefin sulfonate surfactants are mixed in a weight ratio based on active ingredients of from about 1:5 to about 10:1. A preferred weight ratio of alkylated diphenyl sulfonate to alpha-olefin sulfonate is about 1:2 to about 2:1. A more preferred weight ratio based on active ingredients of alkylated diphenyl sulfonate to alpha-olefin sulfonate is about 1:1.

The amounts of surfactants most advantageously employed in preparing the mobility control fluid are dependent on a variety of factors including the specific surfactants and aqueous liquid employed and the specific end-use application. In general, the mobility control fluid will advantageously comprise from about 0.01 to about 10, preferably from about 0.1 to about 5.0 weight percent of the surfactant mixture. In addition to the surfactant mixture, the mobility control fluid may comprise from about zero to about 25 weight percent of a salt such as NaCl or KCl, additional additives such as calcium chloride or magnesium chloride with the remainder being water. The pH of the resulting mobility control fluid may be any which will function in the process of this invention. The pH of the mobility control fluid preferably ranges between about 3 and 10. It is more preferred that the pH of the mobility control fluid be at least about 5 and no greater than about 10.

The drive or displacement fluid employed in the gas flooding operation of the present invention is a gas or a gas/aqueous fluid. The miscible fluid employed in the miscible flooding operation of the present invention is a supercritical fluid in which the crude oil present in the reservoir is soluble. The key difference between the two processes is the pressure at which they operate. The minimum pressure at which first contact miscibility is realized varies as a function of the crude oil in the reservoir and must be measured experimentally for each reservoir. In the miscible fluid operation of the invention, the rapid flow of fluid through the reservoir channels would prevent the buildup of pressure in the channels to above the minimum pressure required for miscibility. The present invention blocks this flow thus allowing the pressure to build behind the foam bank.

In gas flood operations, the gas or gas mixture employed as the drive fluid is suitably any gas or gas mixture which is not significantly soluble in the reservoir crude oil at the temperature and maximum pressure within the reservoir. Air, nitrogen and methane are most often advantageously employed for the gas flooding operations. Crude gases such as exhaust gas or flue gas which are predominantly carbon dioxide and nitrogen may also be used in gas flooding.

In miscible fluid operations, the gases employed are soluble with the reservoir crude oil under the temperatures and pressures within the formation. Carbon dioxide, mixtures of normally gaseous paraffinic hydrocarbons such as methane, ethane, propane or butane as well as normally gaseous olefinic hydrocarbons such as ethylene, propylene or butylene and mixtures thereof are most often advantageously employed in miscible flooding. Mixtures of natural gas and liquefied petroleum gas (LPG) may also be used in miscible flooding.

Although the gas flooding operation or miscible fluid flooding operation can be initiated at essentially any time during the recovery operation, in general, the gas flooding operation or miscible gas flooding operation is initiated following the economic recovery of the hydrocarbon from the reservoir using primary and secondary (e.g., water flooding) recovery techniques on the formation.

In the practice of the present invention, the miscible fluid comprising the miscible gas, or the drive fluid comprising the non-miscible gas or gas/liquid mixture and the mobility control fluid may be injected sequentially or simultaneously into the subterranean formation using techniques known in the art. The miscible fluid comprising the miscible gas is injected for a period of time into the formation through one or more injection wells to solubilize the hydrocarbon contained in the formation thereby reducing its viscosity and allowing it to flow from the small capillaries where it is trapped to the producing well. In the gas flooding method, the drive fluid comprising the non-miscible gas or gas/aqueous fluid mixture is injected, for a period of time, into the formation through one or more injection well(s) to drive the non-trapped or mobile hydrocarbon contained by the formation to the producing well. For example, a five-spot pattern wherein four injection wells are located in a square pattern and a single producing well located at or near the center of the square defined by the injection wells is often advantageously employed. A variety of other patterns are also advantageously employed.

In general, the temperature and pressure at which the gas flooding or miscible fluid operation is conducted and the drive and mobility control fluids are exposed, varies from about 30° C. to about 120° C. and from about 300 to about 6000 psig. The drive fluid or miscible fluid is employed in conventional amounts normally employed in gas drive or miscible fluid flooding operations. In general, injection of the drive fluid or miscible fluid is continued until the recovery of the hydrocarbon becomes unacceptable or until undesirable amounts of the drive fluid or miscible fluid break through into the producing wellbore (i.e., the sweep efficiency of the flooding operation decreases to an unacceptable level). These factors depend, to a large extent, on the specific subterranean formation being treated and the desired levels of hydrocarbon production. At such time, the injection of the drive fluid or miscible fluid into the formation is interrupted and the mobility control fluid is injected into the formation through the same or different injection well. Injection of the mobility control fluid is continued for the desired amount of time. Alternatively, the drive fluid or the miscible fluid and the mobility control fluid may be injected simultaneously for the desired amount of time.

Optionally, after the injection of the surfactant solution or mobility control fluid, water is injected into the formation through the injection wells to drive the surfactant solution into the formation to promote its effectiveness as a mobility control agent. Subsequent to the injection of the mobility control fluid and water, if employed, injection of the same or different drive fluid or miscible fluid is again initiated for a period of time, after which, if further treatment is desired, the injection of the mobility control fluid is again initiated.

The specific conditions at which the mobility control fluid (e.g., the amounts of the mobility control fluid employed and the frequency of treatment with the mobility control fluid) most advantageously employed are dependent on a variety of factors including the specific drive fluid or miscible fluid and mobility control fluid, particularly the specific surfactants, employed in the flooding operation and the specific formation being treated. In general, the mobility control fluid will be employed in an amount of from about 0.05 to about 30 volume percent based on the total volume of the reservoir being treated. More preferably, the mobility control fluid is employed in an amount from about 0.1 to about 10 volume percent based on the total volume of the reservoir being treated.

The method of the present invention can be employed in formations having relatively low salt concentration or high concentrations of salt, e.g., above three percent salt. Good results can be obtained even when the total dissolved solids content of the brine present in the formation is about 25 percent. In addition, the method of the present invention can be employed to formations having varying pH from about 5 to about 10 or higher and is relatively insensitive to formation constituents such as clay, silica and the like, i.e., adsorption losses to the formation are relatively low.

ILLUSTRATIVE EMBODIMENTS

The following examples are given to illustrate the invention and should not be interpreted as limiting it in any way. Unless stated otherwise, all parts and percentages are given by weight. In all cases, the sodium salts of the surfactants are used.

EXAMPLE 1

The surfactant component of the mobility control fluid is prepared by blending equal weights of an aqueous solution of decyl diphenyloxide disulfonate containing 48 percent by weight active material and an aqueous solution of an alpha-olefin sulfonate mixture wherein the average carbon chain length is about 15 and individual units do not vary from this value by more than about three units and which contains 40 percent by weight active material. An amount of the surfactant mixture is dissolved in water containing about 0.5 weight percent NaCl such that the concentration of the surfactant mixture in the mobility control fluid is 2 percent by weight.

Sixty barrels of the mobility control fluid prepared as described above are injected into a reservoir during the miscible hydrocarbon gas stage of a water alternating gas cycle. Gas injection pressure rises from about 19 MPa to about 22 MPa immediately following the injection of the mobility control fluid. The gas injection pressure declines back to about 19 MPa over a period of seven days. The procedure is repeated several times with comparable results.

EXAMPLE 2

Effect of Surfactant Blend on Adsorption of Surfactants to Clays

Samples consisting of 20-ml portions of an aqueous solution containing 1000 parts per million (ppm) of the specified surfactant or surfactant mixture and either 1 percent or 5 percent of sodium chloride as shown in Table I are exposed to 0.5-g portions of kaolin clay and to 0.5-g portions of montmorillonite clay. After about 4 hours exposure at room temperature, the surfactant concentration of each sample solution is measured using methylene blue titration such as is described in ASTM D-1681-83. The error in the measurement of the surfactant concentration is about plus or minus 10 percent. The data obtained is given in Table I below.

TABLE I

| Mineral | NaCl Concentration (wt %) | Surfactant Concentration (ppm) | | |
|---|---|---|---|---|
| | | A① | B② | C③ |
| Montmorillonite | 1 | 76 | 686 | 526 |
| | 5 | 4 | 910 | 989 |
| Kaolin | 1 | 779 | 833 | 758 |
| | 5 | 830 | 1112 | 1112 |

① A 50:50 mixture of $C_{14}$ alpha-olefin sulfonate and $C_{16}$ alpha-olefin sulfonate
② Decyldiphenyl disulfonate
③ A 50:50 weight ratio blend of A and B The data in Table I above demonstrate that the alpha-olefin surfactant is strongly adsorbed onto montmorillonite. When mixed with an alkyl diphenyl disulfonate, the adsorption is decreased substantially. The data also demonstrates that at higher ionic strengths, the effect of the mixing the alkyl diphenyl disulfonate is increased.

EXAMPLE 3

Effect of Surfactant Blend on Mobility Control Factors

A sandpack consisting of 20-30 mesh Ottawa sand and measuring 10 cm by 2 cm is wetted with a solution of surfactant which is drawn through the sandpack by a vacuum. The same vacuum, generated by a water aspirator, is used to provide the driving force to move a specified volume of gas through the sand pack wetted with the surfactant. The gas used in each run is air. The amount of surfactant used to wet the sandpack is 10 ml. The time required to move the gas through the sand pack is measured using various surfactant blends and varying salt concentrations and the results obtained are reported in Table II below.

TABLE II

| Surfactant Concentration | | Mobility Reduction Factor [1] NaCl Concentration | | |
|---|---|---|---|---|
| % DPS[2] | % AOS[3] | 0.0 | 1.0 | 5.0 |
| 0.5 | 0.0 | 28.5 | 33.5 | 14.5 |
| 0.4 | 0.1 | 32.0 | 35.0 | 22.0 |
| 0.3 | 0.2 | 38.0 | 39.5 | 26.0 |
| 0.2 | 0.3 | 40.5 | 42.5 | 27.0 |
| 0.1 | 0.4 | 46.0 | 43.0 | 24.0 |
| 0.0 | 0.5 | 42.5 | 38.0 | 20.5 |

[1]Mobility Reduction Factor is the ratio of the time required for 50 ml of air to progress through surfactant wet sand to the time required for 50 ml of air to progress through water wet sand
[2]Decyl diphenyloxide disulfonate
[3]Alpha-olefin sulfonate The data in Table II above show that at several brine concentrations, the use of a mixture of the alpha-olefin sulfonate and alkylated diphenyloxide disulfonate results in an improved mobility control factor when the proper blend is used. The improvement in the mobility control factor obtained using a blend of surfactants increases at the higher brine concentrations.

EXAMPLE 4

Solubility of Surfactant Blends in Sodium Chloride Brines

Samples of blended surfactants are made by mixing an aqueous solution of decyl diphenyloxide disulfonate containing 48 percent by weight active material and an aqueous solution of an alpha-olefin sulfonate mixture wherein the average carbon chain length is about 15 and individual carbon chain lengths do not vary from this value by more than about three units and which contains 40 percent by weight active material. The samples are made such that the ratio of decyl diphenyloxide disulfonate to alpha-olefin sulfonate is varied from 0:1 to 1:0 as shown in Table III below. These samples are added dropwise to stirred 25-ml aliquots of aqueous solutions of sodium chloride of various concentrations at room temperature. The solubility of the samples in the sodium chloride solutions is noted as shown in Table III below.

TABLE III

| Surfactant | | Solubility Concentration NaCl (w/w %) | | |
|---|---|---|---|---|
| % AOS[1] | % DPS[2] | 20 | 10 | 5 |
| 100 | 0 | I[3] | I | C[4] |
| 96 | 4 | I | I | S[5] |
| 92 | 8 | I | I | S |
| 88 | 12 | I | S | S |
| 84 | 16 | I | S | S |
| 80 | 20 | I | S | S |
| 60 | 40 | S | S | S |
| 40 | 60 | S | S | S |
| 20 | 80 | S | S | S |
| 0 | 100 | S | S | S |

[1]Alpha-olefin sulfonate
[2]Decyl diphenyloxide disulfonate
[3]Precipitate forms on adding one drop of surfactant. Further surfactant always causes more precipitate
[4]A cloudy mixture forms on adding the first few drops of surfactant. Adding additional surfactant causes the mixture to clarify
[5]Surfactant soluble, giving clear solutions at all concentrations of surfactant The above data demonstrates that the solubility of the alpha-olefin sulfonate in the sodium chloride brine is increased when the alpha-olefin sulfonate is blended with decyl diphenyloxide disulfonate.

EXAMPLE 5

Solubility of Surfactant Blends in Sodium Chloride/Calcium Chloride Brines

Samples of blended surfactants are made by mixing an aqueous solution of decyl diphenyloxide disulfonate containing 48 percent by weight active material and an aqueous solution of an alpha-olefin sulfonate mixture wherein the average carbon chain length is about 15 and individual carbon chain lengths do not vary from this value by more than about three units and which contains 40 percent by weight active material. The samples are made such that the ratio of decyl diphenyloxide disulfonate to alpha-olefin sulfonate is varied from 0:1 to 4:6. These samples are then added dropwise to stirred 25-ml aliquots of aqueous solutions at room temperature containing equal weights of sodium chloride and calcium chloride at the concentrations as shown in Table IV below.

TABLE IV

| Surfactant | | Solubility Concentration of NaCl/CaCl$_2$ (w/w %) | | |
|---|---|---|---|---|
| % AOS[1] | % DPS[2] | 20 | 10 | 5 |
| 100 | 0 | I[3] | I | I |
| 92 | 8 | I | I | I |
| 84 | 16 | CI[4] | C | CS[5] |
| 80 | 20 | CS | CS | S[6] |
| 60 | 40 | S | S | S |

[1]Alpha-olefin sulfonate
[2]Decyl diphenyloxide disulfonate
[3]Precipitate forms on adding one drop of surfactant. Further surfactant always causes more precipitate
[4]A cloudy mixture forms on adding the first few drops of surfactant. Adding additional surfactant does not cause the mixture to clarify
[5]A cloudy mixture forms on adding the first few drops of surfactant. Adding additional surfactant causes the mixture to clarify
[6]Surfactant soluble, giving clear solutions at all concentrations of surfactant The results shown above demonstrate that the solubility of the alpha-olefin sulfonate in the brine containing both sodium and calcium ions is increased when the alpha-olefin sulfonate is blended with decyl diphenyloxide disulfonate.

What is claimed is:

1. A method for recovering hydrocarbons from a subterranean formation comprising injecting, under non-steam flood conditions, into the subterranean formation through an injection well, a first fluid selected from group consisting essentially of (1) a drive fluid of a gas or a gas/aqueous fluid mixture and (2) a miscible fluid to move the hydrocarbon from the formation to a producing well; and a second fluid which is a mobility control fluid comprising a surfactant/water mixture wherein the surfactant component of the mobility control fluid consists essentially of a mixture of at least one alkylated diphenyl sulfonate and at least one alpha-olefin sulfonate.

2. The method of claim 1 wherein the first fluid is a drive fluid of a gas or a gas/aqueous fluid mixture which drives the hydrocarbons from the formation to the producing well.

3. The method of claim 1 wherein the first fluid is a miscible fluid which solubilizes the hydrocarbons and carries them from the formation to the producing well.

4. The process of claim 1 wherein the first fluid and the second fluid are injected simultaneously.

5. The process of claim 1 wherein the first fluid and the second fluid are injected sequentially.

6. The method of claim 1 wherein the surfactants in the mobility control fluid consist essentially of a mixture of at least one alkylated diphenyl sulfonate represented by the general structural formula:

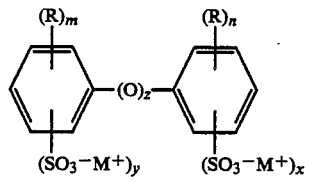

wherein z is 0 or 1; each R is independently an alkyl or substituted alkyl radical; each m and n is independently 0, 1 or 2, provided at least one of m or n is 1; each M is independently hydrogen, an alkali metal, alkaline earth metal, or ammonium and each x and y is individually 0 or 1 with the proviso that at least one of x or y is 1; and at least one alpha-olefin sulfonate.

7. The method of claim 6 wherein z is 1, the R group(s) are independently hydrogen or a linear or branched alkyl group having from 4 to 14 carbon atoms and each M is independently hydrogen or an alkali metal and the alpha-olefin sulfonate contains 10 to 18 carbon atoms.

8. The method of claim 6 wherein z is 1, the R group(s) are independently hydrogen or a linear alkyl group having from 6 to 10 carbon atoms and M+ represents an ammonium ion radical of the formula $(R')_3HN^+$ wherein each R' is independently hydrogen, a $C_1$-$C_4$ alkyl or a $C_1$-$C_4$ hydroxyalkyl radical and the alpha-olefin sulfonate contains about 14 to about 16 carbon atoms.

9. The method of claim 8 wherein the $C_1$-$C_4$ alkyl and hydroxyalkyl radicals include methyl, ethyl, propyl, isopropyl, butyl, hydroxmethyl and hydroxyethyl and the ammonium ion radical is ammonium ($N^+H_4$), methylammonium ($CH_3N^+H_3$), ethylammonium ($C_2H_5N^+H_3$), dimethylammonium (($CH_3)_2N^+H_2$), methylethylammonium ($CH_3N^+H_2C_2H_5$), trimethylammonium (($CH_3)_3N^+H$), dimethylbutylammonium (($CH_3)_2N^+HC_4H_9$), hydroxyethylammonium ($HOCH_2CH_2N^+H_3$) and methylhydroxyethylammonium ($CH_3N^+H_2CH_2CH_2OH$).

10. The method of claim 6 wherein the surfactant mixture in the mobility control fluid consists essentially of from about 0.05 to about 2.5 weight percent of the alkylated diphenyl sulfonate or mixture of alkylated diphenyl sulfonates and from about 0.05 to 2.5 weight percent of the alpha-olefin sulfonate or mixture of alpha-olefin sulfonates.

11. The method of claim 6 wherein the surfactant mixture in the mobility control fluid consists essentially of the alkylated diphenyl sulfonate and the alpha-olefin sulfonates in a weight ratio of at least about 1:5 and no greater than about 10:1.

12. The method of claim 11 wherein the surfactant mixture in the mobility control fluid consists essentially of the alkylated diphenyl sulfonates and the alpha-olefin sulfonates in a weight ratio of about 1:1.

13. The method of claim 6 wherein a mixture of alkylated diphenyl sulfonates is used.

14. The method of claim 13 wherein at least about 50 weight percent of the alkylated diphenyl sulfonates are disulfonates.

15. The method of claim 14 wherein at least about 75 weight percent of the alkylated diphenyl sulfonates are disulfonates.

16. The method of claim 15 wherein at least about 90 weight percent of the alkylated diphenyl sulfonates are disulfonates.

17. The method of claim 2 wherein the drive fluid is a gas selected from the group consisting essentially of air, nitrogen, methane, exhaust gas, flue gas and mixtures thereof.

18. The method of claim 3 wherein the miscible gas is selected from the group consisting essentially of carbon dioxide, methane, ethane, propane, butane, ethylene, propene, butene, natural gas, liquefied petroleum gas and mixtures thereof.

19. The method of claim 1 wherein the hydrocarbons are recovered from a subterranean formation at temperatures ranging from about 30° C. to about 120° C. and pressures ranging from about 30 psig to about 6000 psig.

* * * * *